Feb. 13, 1940.　　　F. C. PETERSEN　　　2,189,865
STRAIN RELIEVING DEVICE
Filed April 28, 1938
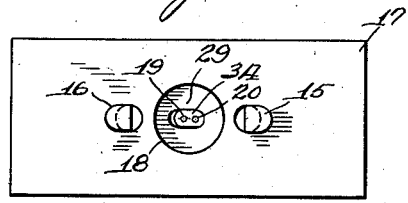
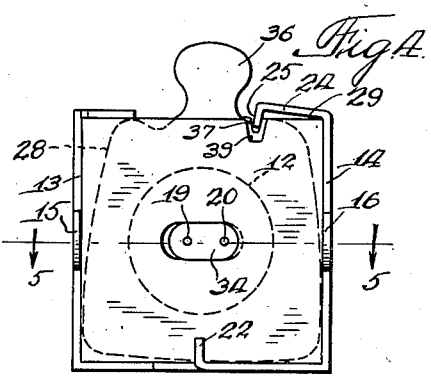
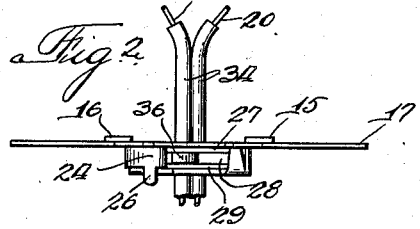
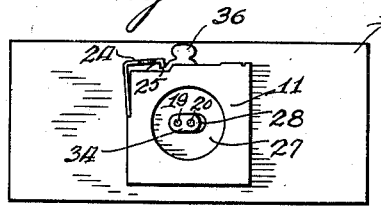
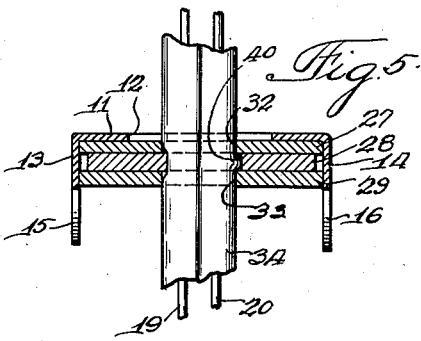
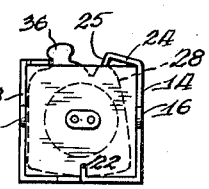
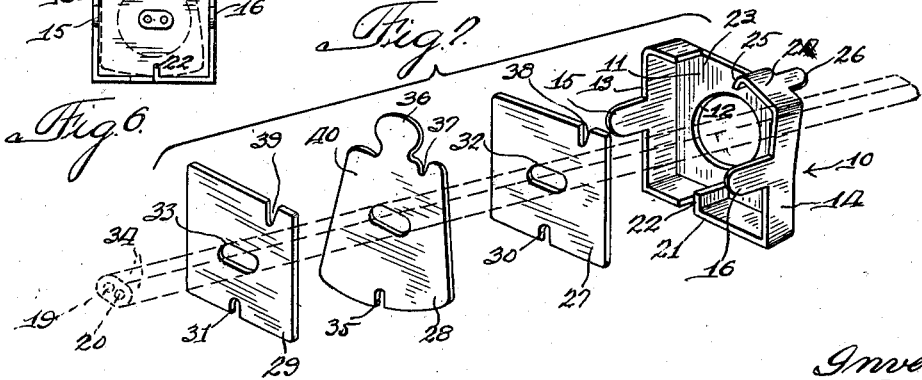
Inventor
Frank C. Petersen Patented Feb. 13, 1940

2,189,865

UNITED STATES PATENT OFFICE 2,189,865

STRAIN RELIEVING DEVICE

Frank C. Petersen, Glen Ellyn, Ill., assignor to George D. Ladd, Lockport, Ill.

Application April 28, 1938, Serial No. 204,713

6 Claims. (Cl. 173—322)

My invention relates to strain relievers for electric conductors, more particularly to strain relieving devices of the type adapted to be secured to panels and the like through which suitable conductors pass for connection to terminal members, and my invention has for an object the provision of a device of this character which is simple and economical in its construction, which is reliable in its operation, and which is of extreme flexibility in its application.

In many different types of electrical devices and apparatus utilizing electric conductors connected either mechanically or by soldering to suitable terminal members, difficulties arise due to the fact that the strains inevitably imposed on the conductors during use or during installation may result in pulling the conductors loose from the terminal members. Since it is virtually impossible to eliminate the various conditions which give rise to such strains on the conductors, numerous strain relieving devices have heretofore been proposed for engaging the conductors at a point or at points between the sources of strain and the terminals, so as to absorb the strains imposed on the conductors and thus relieve the terminal connections.

As will be understood by those skilled in the art, it is often desirable to change the connections of electrical apparatus and accordingly the strain relieving devices must be readily removable or releasable, and must not be of such a character as permanently to connect the conductors to a rigid member, such as a panel, through which the conductors pass. Many of the so-called strain relievers heretofore known in the art are difficult to apply, are incapable of being readily released, are exceedingly expensive or are only partially effective, and accordingly something is yet to be desired in strain relieving devices for electrical conductors.

It is therefore a further object of my invention to provide a strain relieving device of the type adapted to be secured to a panel, or the like, through which suitable conductors pass, the strain relieving device being capable of quick application to a panel, being readily adjustable to lock or release the conductors, and consisting of a relatively few and simple parts.

In carrying out my invention in one form, I provide a plurality of flat discs arranged in substantially face-to-face relation and having apertures through which the conductors pass, means for rigidly positioning at least one of the discs against transverse movement, and means for moving another of the discs transversely between two positions. When the movable disc is in one position the respective apertures are aligned to permit ready passage of the conductors therethrough, and when the movable disc occupies its second position the respective apertures are in partially offset relation so as tightly to clamp the conductors against longitudinal movement through the discs. Thus any strains imposed upon the conductors at one side of the strain relieving device are absorbed by the device and cannot be transmitted to the terminal connections on the other of the strain relieving device.

More particularly, my improved strain relieving device comprises a box-like open ended frame adapted to be mounted on or connected to a panel through which the conductors are to pass, and adapted to receive a plurality of apertured discs. Preferably, three discs are provided, each being notched to receive a positioning tab extending inwardly from one side wall of the frame and each having a centrally located conductor-receiving aperture. The two outer discs are so shaped as to be fixedly positioned by engagement with the tab and the sides of the frame, and the inner disc is shaped so as to permit pivotal movement thereof within the frame, the tab serving as a pivot point. In order to move the inner disc between two positions, a handle is provided extending through an aperture in the side of the frame opposite from the positioning tab, and when the inner disc is in one position the apertures in all of the discs are aligned so that conductors may readily be passed therethrough for connection to suitable terminal members. When the movable inner disc is operated to its other position the aperture therein is partially offset from the apertures in the fixed outer discs so as tightly to clamp or lock the conductors against longitudinal movement through the strain relieving device.

In order positively to lock the movable disc in its clamping position while providing for the ready release thereof, one edge of the movable disc is provided with a notch adjacent the handle of the disc, which notch is adapted to receive a locking detent that consists of a tab extending inwardly from the side of the frame adjacent the handle-receiving aperture, the portion of the side of the frame which carries the locking detent or tab being arranged to flex so as to permit movement of the detent or tab between locking and releasing positions.

For a more complete understanding of my invention reference should now be had to the drawing, in which:

Fig. 1 is an elevational view of the front of a portion of a panel having my improved strain relieving device mounted thereon;

Fig. 2 is a top view of the panel and strain relieving device shown in Fig. 1;

Fig. 3 is a back view of the panel and strain relieving device shown in Figs. 1 and 2;

Fig. 4 is an enlarged elevational view of my improved strain relieving device before it is applied to a panel;

Fig. 5 is a sectional view taken along the line 5—5 of Fig. 4;

Fig. 6 is an elevational view similar to Fig. 4 but showing the strain relieving device in its releasing position; and Fig. 7 is an exploded perspective view of the strain relieving device shown in Figs. 4, 5, and 6.

Referring now to the drawing, I have shown by invention as applied to a strain relieving device of the type adapted to be secured to a panel through which electric conductors pass, the strain relieving device comprising a frame 10, which is preferably stamped from a single piece of sheet metal, the front end of the frame 10 being entirely open and the rear end wall 11 of the frame having an aperture 12 therein, so that a substantially open ended frame is provided. As shown, two opposite side walls 13 and 14 of the frame 10 are provided with extending tabs or ears 15 and 16 by means of which the frame may be secured to a suitable panel 17, such, for example, as is shown in Figs. 1, 2, and 3, the ears 15 and 16 extending through apertures in the panel 17 and being overturned, as shown, securely to mount the frame on the panel. The panel 17 is, of course, provided with a suitable aperture 18 through which electric conductors 19 and 20 extend, as shown best in Fig. 2.

Referring particularly to Fig. 7, the lower side wall 21 of the frame 10 is provided, as shown, with an inwardly extending tab 22, which is preferably formed integrally with the side 21 by slitting the side and bending a portion thereof inwardly. The purpose of this tab 22 will be more fully described hereinafter. The upper side of the frame 10 is cut away, as shown in Fig. 7, to provide an aperture 23, and a portion of this upper side together with a portion of the side 14 is separated from the rear wall 11 of the frame, as shown best in Figs. 3 and 7, so as to form a spring finger 24 which carries an inwardly extending detent or tab 25, and which is provided with an operating handle or tab 26.

In addition to the open ended frame thus far described, my improved strain relieving device includes a plurality of substantially flat discs 27, 28, and 29 that are preferably formed of insulating material, such for example as fiber, and that are adapted to be positioned within the frame 10. As shown, the discs 27 and 29 are identical in shape and are of substantially the same configuration as the frame 10, each of these discs being provided with a notch in the lower edge thereof adapted to receive the inwardly extending tab 22 when the discs are positioned within the frame 10, the notch in the disc 27 being indicated by the reference numeral 30 and the corresponding notch in the disc 29 being represented by the reference numeral 31. Furthermore, the discs 27 and 29 are respectively provided with substantially centrally located apertures 32 and 33, respectively, for receiving suitable conductors, such for example as the conductors 19 and 20.

Although I have shown for purposes of illustration a two-wire conductor in which the individual conductors 19 and 20 are surrounded by coverings 34 of suitable insulating material, the coverings being formed with substantially flat sides and secured together so as to form, in effect, a single double-conductor cable, it will be understood, of course, that any desired number of conductors may be used and that the conductors may be covered with individual insulating covers, or with a single common insulating cover, as desired.

The disc 28, as shown best in Fig. 7, differs considerably from the discs 27 and 29, the lower arcuately shaped edge of the disc 28 being provided with a notch 35 for receiving the tab 22 of the frame 10, the sides of the disc 28 tapering inwardly from the bottom and the upper edge of the disc 28 being provided with a handle 36 and with a notch 37 for receiving the locking detent or tab 25 carried by the spring finger 24 of the frame 10. Similarly, the disc 27 is provided with a notch 38 for receiving the detent 25, and the disc 29 is provided with a notch 39 for receiving the detent 25. An aperture 40 in the disc 28, similar to apertures 32 and 33 in the discs 27 and 29, provides for passage of the conductors 19 and 20 therethrough.

In order to assemble my improved strain relieving device, it is necessary only to position the discs 27, 28, and 29 in the frame 10 in the respective order shown in Fig. 7, so that the disc 28 is positioned between the discs 27 and 29 with the positioning tab 22 extending into the notches 30, 35, and 31. The frame 10 may then be secured to the panel 17, as described above, simply by inserting the ears 15 and 16 of the frame through suitable apertures in the panel and bending over the extending ends of the ears.

With the discs 27, 28, and 29 thus assembled within the frame 10, it will be apparent that the discs 27 and 29 are fixedly positioned against movement by engagement of the positioning tab 22 with the notches 30 and 31, and by engagement of the edges of the discs 27 and 29 with the sides 13 and 14 of the frame 10. The disc 28, however, by reason of its arcuately shaped lower edge and its sloping side edges, is free to move substantially transversely within the frame, the positioning tab 22 in cooperation with the notch 35 forming a pivot point and the handle 36, which extends through the aperture 23 in the upper side of the frame, providing means for pivotally moving the disc 28 within the frame 10.

The conductor-receiving apertures 32, 40, and 33 in the discs 27, 28, and 29, respectively, are so arranged that when the disc 28 is moved to its extreme left-hand position, as viewed in Figs. 4, 6, and 7, all of the apertures will be in alignment, and thus the conductors 19 and 20 may be freely passed therethrough for connection to suitable terminal members. After the conductors 19 and 20 have thus been connected, however, they may be locked against longitudinal movement with respect to the strain relieving device simply by operating the movable disc 28 from the extreme left-hand position, shown in Fig. 6, to the extreme right-hand position shown in Fig. 4. Upon movement of the disc 28 to this position the aperture 40 in the disc 28 assumes a partially offset position with respect to the apertures 32 and 33 in the discs 27 and 29, the size of the apertures being such, with respect to the dimensions of the insulating covering 34 on the conductors 19 and 20, that this covering is pinched or clamped, as shown best in Fig. 5.

It will now be apparent that if longitudinal strain is imposed upon the conductors 19 and 20, this strain will be absorbed by the strain relieving device, the clamping relation of the discs 27, 28, and 29 with respect to the conductors being such as to prevent longitudinal movement of the conductors and thus prevent transmission of the strain to the terminal connections.

Whenever the disc 28 is moved to its locking position, that is, the position shown in Figs. 3 and 4, it will be positively locked in that position by movement of the spring finger 24 so that the detent or tab 25 extends into the notch 37 in the disc 28, the notches 38 and 39 in the discs 27 and 29 permitting such movement of the locking detent 25. As shown best in Fig. 6 the detent or tab 25 rests upon a shoulder adjacent the notch 37 in the disc 28 so long as the disc 28 is in a position other than its locking position, and accordingly the disc 28 is free to move. If it is desired to release the conductors 19 and 20 so as to change the terminal connections thereof, it is necessary only to raise the detent 25, as for example by pressing upwardly on the operating handle 26 of the spring finger 24, and then to move the disc 28 from the clamping or locking position shown in Figs. 3 and 4 to the releasing position shown in Fig. 6. This brings the apertures 32, 40, and 33 again into alignment, and accordingly the conductors 19 and 20 may be withdrawn from or moved longitudinally relative to the frame 10 and the discs 27, 28, and 29.

Although I have shown the apertures 32, 40, and 33 as being of such a size and such a shape as conveniently to receive a double conductor type of cable, such as is shown in the drawing, it will be understood that these apertures may be of any suitable size and shape, the only requirement being that the apertures be so formed that a pinching or clamping of the conductors will be accomplished when the disc 28 is moved from its releasing to its locking or clamping position.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A strain relieving device for electric conductors adapted to be connected to suitable terminals, said device comprising a pair of disc-like members disposed in spaced face-to-face relation and supported against transverse movement, each of said members having a conductor-receiving aperture therein, a third disc-like member, means mounting said third member between said spaced members for pivotal transverse movement from a first position to a second position, said third member being shaped to leave unobstructed the said apertures in said spaced members when said third member occupies said first position whereby electric conductors may readily be passed therethrough, means for operating said third member to said second position to move a portion of said third member across said apertures and clamp said conductors between an edge of said portion and the edges of said apertures, and resilient detent means movable in cooperating openings in said members for automatically locking said third member in said second position upon operation thereto, said detent means including an extending portion providing for manual operation of said detent means to release said third member for movement from said second position to said first position.

2. A strain relieving device for electric conductors comprising a box-like frame having open ends through which said conductors may extend, a plurality of discs within said frame having conductor receiving apertures therethrough, means including a tab extending inwardly from a side of said frame and engaging notches in said discs for preventing transverse movement of one of said discs, another of said discs being mounted for pivotal movement about said tab between a first and a second position, said apertures in said discs being aligned when said other disc is in said first position whereby said conductors may be passed therethrough, means extending through an aperture in a side of said frame for operating said other disc to said second position to move the aperture therein into offset relation to the aperture in said one disc thereby to clamp said conductors against movement relative to said device, and means including a releasable detent integral with a side of said frame for locking said other disc in said second position.

3. A strain relieving device for electric conductors comprising a box-like frame having open ends through which said conductors may extend, a plurality of discs within said frame having conductor receiving apertures therethrough, means including a tab extending inwardly from a side of said frame and engaging notches in said discs for preventing transverse movement of the two outer ones of said discs, means for pivotally moving an intermediate one of said discs between a first and a second position, said tab forming a pivot for said intermediate disc, said apertures in said discs being aligned when said intermediate disc occupies said first position whereby said conductors may be passed therethrough for connection to suitable terminals, the aperture in said intermediate disc when in said second position being sufficiently offset from the apertures in said outer discs to tightly clamp said conductors between the edges of said apertures and prevent movement of said conductors relative to said device, and means including a notch in said intermediate disc cooperating with a releasable detent integral with said frame for locking said intermediate disc in said second position.

4. A strain relieving device for electric conductors comprising a box-like frame having open ends through which said conductors may extend, a plurality of discs positioned in substantially face-to-face relation within said frame, said discs being substantially parallel to the open ends of said frame and having conductor receiving apertures, a tab extending inwardly from one side of said frame to engage cooperating notches in said discs, the two outer ones of said discs being held against transverse movement by engagement with said tab and with the sides of said frame, an intermediate disc being shaped to provide for pivotal movement thereof between two positions, said tab forming a pivot for said intermediate disc, the apertures in said discs being aligned to permit ready passage of conductors therethrough when said intermediate disc occupies one position, means for operating said intermediate disc to its second position to move the aperture therein into offset relation to the apertures in said outer discs thereby to clamp said conductors between the edges of said apertures, and means for locking said intermediate disc in said second position including a detent extending inwardly from a spring finger formed integrally with a side of said frame, said detent normally engaging an edge of said intermediate disc and being adapted upon movement of said intermediate disc to said second position to engage cooperating notches in the edges of said discs.

5. A strain relieving device for electric conductors comprising a frame having open ends through which said conductors may extend, a plurality of discs within said frame, at least one of which has a conductor receiving aperture therethrough facing said open ends of said frame, means including a tab on said frame engaging openings in said discs for preventing transverse movement of said one disc, another of said discs being mounted for pivotal movement about said tab between a first and a second position, said other disc being so formed as to leave unobstructed said aperture when said other disc is in said first position whereby said conductors may be passed therethrough, means extending outwardly from one side of said frame for operating said other disc to said second position to move a portion of said other disc across said aperture and clamp said conductors against movement relative to said device, and means including a releasable detent supported by said frame in cooperating relation with said discs for locking said other disc in said second position.

6. A strain relieving device for electric conductors comprising a frame having open ends through which said conductors may extend, a pair of disc-like members positioned within said frame having conductor-receiving apertures therethrough, means including a tab on said frame engaging said members for preventing transverse movement of said members in said frame, a third disc-like member positioned within said frame intermediate said pair of members and mounted for pivotal movement about said tab between a first and a second position, said third member being shaped to leave unobstructed the said apertures in said pair of members when said third member occupies said first position whereby said conductors may be freely passed through said apertures for connection to suitable terminals, means for operating said third member to said second position to move a portion of said third member across said apertures and tightly clamp said conductors between an edge of said portion and the edges of said apertures, and means including a resilient detent for automatically locking said third member in said second position upon operation thereto, said detent including an extending portion providing for manual operation of said detent to release said third member.

FRANK C. PETERSEN.